United States Patent
Rangaswamaiah et al.

(10) Patent No.: US 9,187,133 B2
(45) Date of Patent: Nov. 17, 2015

(54) FRONT PILLAR CONSTRUCTION HAVING REINFORCEMENT MEMBER FOR VEHICLE FRAME

(71) Applicant: Honda Motor Co., Ltd., Tokyo (JP)

(72) Inventors: Shivaprasad G. Rangaswamaiah, Dublin, OH (US); Ryan A. Miller, Columbus, OH (US); William J. Gross, Marysville, OH (US); Jeremy P. Lucas, Delaware, OH (US); Edouard S. Sandoz, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/194,855

(22) Filed: Mar. 3, 2014

(65) Prior Publication Data

US 2015/0246692 A1    Sep. 3, 2015

(51) Int. Cl.
| | |
|---|---|
| B62D 25/04 | (2006.01) |
| B62D 21/15 | (2006.01) |
| B60R 21/00 | (2006.01) |

(52) U.S. Cl.
CPC ............... B62D 25/04 (2013.01); B62D 21/15 (2013.01); *B60R 2021/0004* (2013.01); *B60R 2021/0009* (2013.01)

(58) Field of Classification Search
CPC .. B60R 19/00; B60R 19/54; B60R 2019/002; B60R 2021/0004; B60R 2021/0009; B60R 2021/0023; B62D 21/15; B62D 21/152; B62D 21/155; B62D 25/04; B62D 25/08; B62D 25/20; B62D 25/2018; B62D 25/2036
USPC ......... 296/30, 187.03, 187.08, 187.09, 187.1, 296/193.06, 193.07, 193.09, 209; 280/784, 280/762
See application file for complete search history.

(56) References Cited

U.S. PATENT DOCUMENTS

| | | | |
|---|---|---|---|
| 3,881,742 | A | 5/1975 | Felzer |
| 5,275,436 | A | 1/1994 | Pomero |
| 6,286,867 | B1 | 9/2001 | Braemig et al. |
| 6,364,358 | B1 | 4/2002 | Miller |
| 8,382,195 | B2 | 2/2013 | Iwase et al. |
| 8,469,442 | B1 | 6/2013 | Pencak et al. |
| 2013/0161932 | A1* | 6/2013 | Murray .................. 280/784 |
| 2013/0200650 | A1 | 8/2013 | Matsuoka et al. |

FOREIGN PATENT DOCUMENTS

| | | | |
|---|---|---|---|
| DE | 102004021165 A1 | * | 11/2005 |
| DE | 102010014749 A1 | * | 11/2010 |
| JP | 2005193843 | | 7/2005 |
| JP | 2013001235 A | | 1/2013 |
| WO | WO2013121890 A1 | * | 8/2013 |

OTHER PUBLICATIONS

German to English translation of DE 10 2010 014 749; retreived via Espacenet-Patentranslate (www.EPO.org) on Jun. 5, 2015.*
German to English translation of DE 10 2004 021 165; retreived via Espacenet-Patentranslate (www.EPO.org) on Jun. 5, 2015.*

* cited by examiner

*Primary Examiner* — Jason S Daniels
(74) *Attorney, Agent, or Firm* — Rankin, Hill & Clark LLP

(57) ABSTRACT

A front pillar construction on a vehicle frame includes a pillar inner member having pillar inner member mating flanges and a pillar outer member having pillar outer member mating flanges welded to the pillar inner member mating flanges to form a front pillar member with a hollow construction. The front pillar construction further includes an angled reinforcement member fixedly secured to the pillar member at a location arranged to break a wheel of the vehicle disposed immediately forward of the pillar member during small overlap frontal crashes wherein the wheel is forced rearward toward the pillar member.

18 Claims, 4 Drawing Sheets

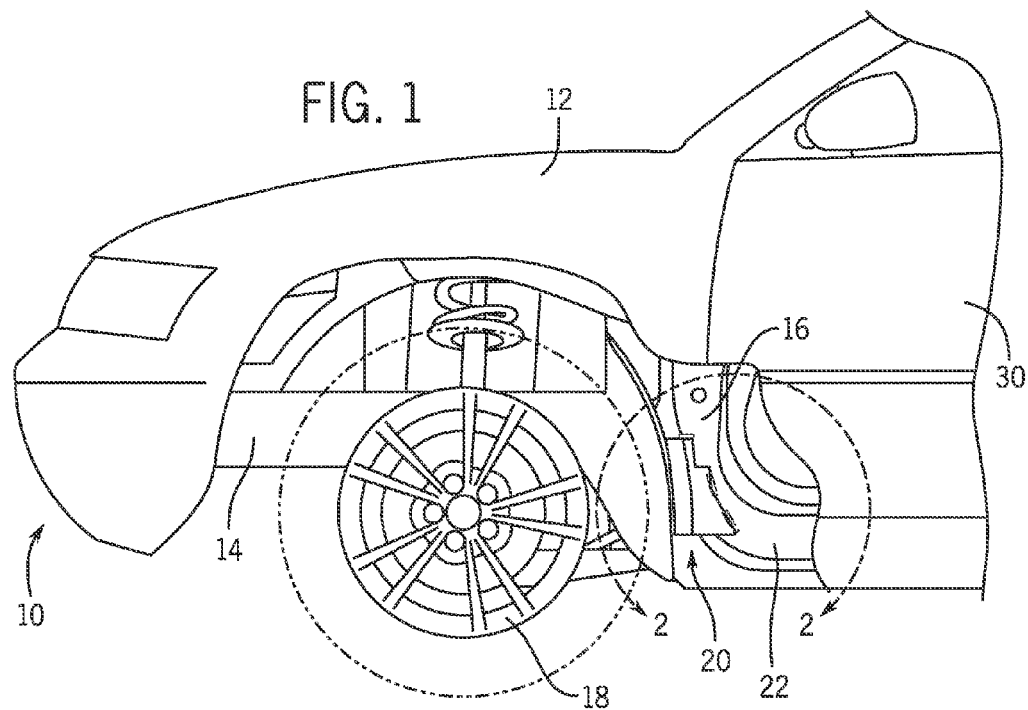
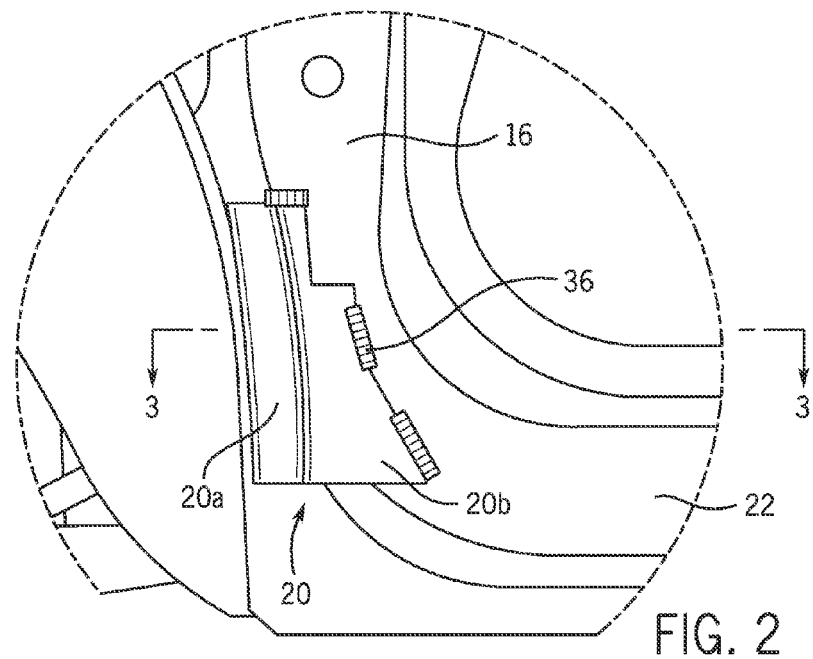

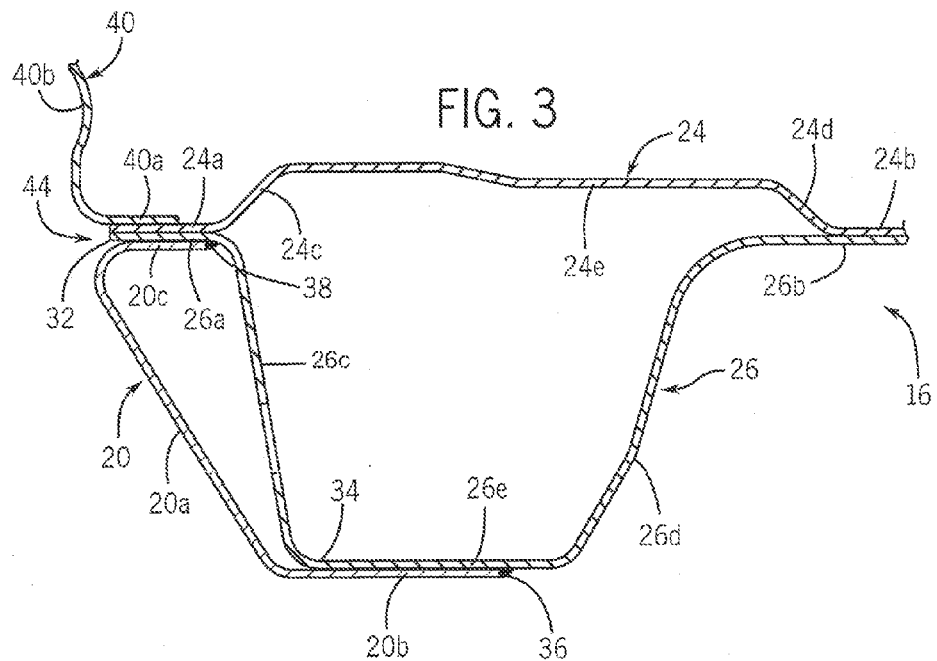
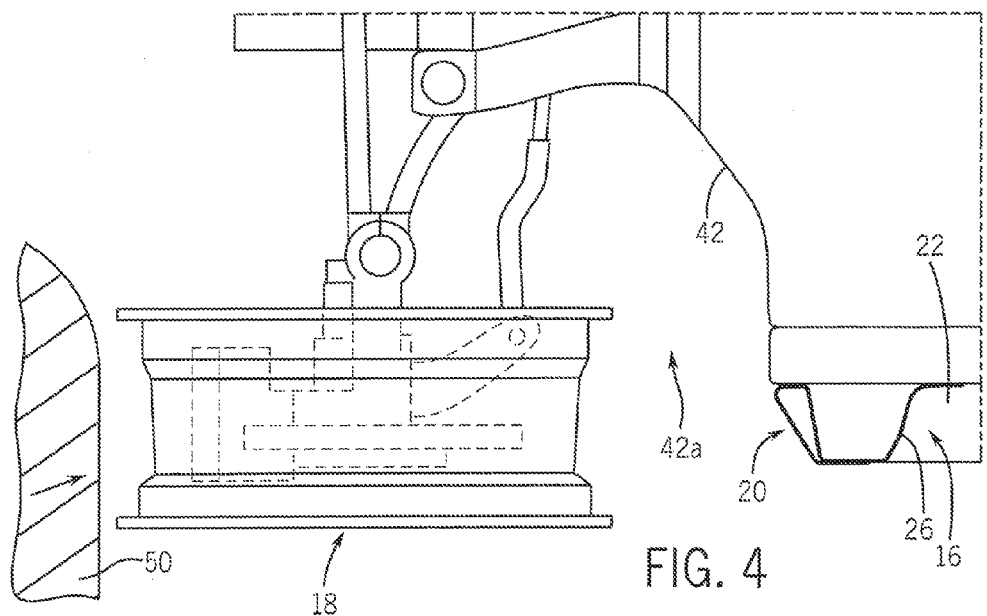

FRONT PILLAR CONSTRUCTION HAVING REINFORCEMENT MEMBER FOR VEHICLE FRAME

BACKGROUND

In the event of a small offset frontal vehicle collision, such as where the vehicle impacts an object (e.g., another vehicle, a tree, a pole, etc.) laterally outside the main front frame, the front wheel nearest the crash can be driven back toward the adjacent hinge pillar and side sill member, both disposed immediately behind the wheel. This can result in crash energy being driven toward the side sill member by the wheel and outside the main front frame. This is not preferred as the main front frame is the primary energy structure intended for handling frontal crashes.

More particularly, during such a small overlap frontal crash, the front wheel nearest the crash, which is typically constructed stiffer than the vehicle cabin, can become trapped between the object struck and the lower portion of the vehicle hinge pillar. When this occurs, and absent any countermeasures, it is possible that the wheel could directly load and damage the vehicle safety cage or vehicle cabin and thereby intrudes into the occupant compartment. This has the potential to cause high occupant injuries. Obviously, this would be unacceptable so certain countermeasures are implemented to avoid this scenario. For example, one conventional method for addressing this concern is to add a large amount of reinforcements to the safety cage to make it stiffer than the wheel. Unfortunately, while this solution can eliminate the problem with the wheel compromising the vehicle safety cage or vehicle cabin, this greatly increases the weight of the vehicle frame.

SUMMARY

According to one aspect, a vehicle frame includes a pillar member disposed rearward of a wheel and a reinforcement member fixedly secured to the pillar member at a location arranged to break the wheel during small overlap frontal crashes wherein the wheel is forced rearward toward the pillar member.

According to another aspect, a front pillar construction for a vehicle includes a pillar inner member having pillar inner member mating flanges and a pillar outer member having pillar outer member mating flanges welded to the pillar inner member mating flanges to form a front pillar member with a hollow construction. The front pillar construction further includes an angled reinforcement member fixedly secured to the pillar member at a location arranged to break a wheel of the vehicle disposed immediately forward of the pillar member during small overlap frontal crashes wherein the wheel is forced rearward toward the pillar member.

According to a further aspect, the reinforcement member for a vehicle frame includes an angled wall defining a wedge shape for breaking a wheel during a small overlap frontal crash, and overlapping rear flange extending rearwardly from the angled wall to overlap a projecting surface portion of a pillar outer member, and an overlapping forward flange extending rearwardly from the angled wall at a laterally spaced apart location relative to the overlapping rear flange to overlap a forward mating flange of the pillar outer member.

BRIEF DESCRIPTION OF THE DRAWINGS

FIG. 1 is a partial schematic elevational view of a vehicle having a reinforcement member secured to a front pillar of a vehicle frame according to an exemplary embodiment.

FIG. 2 is an enlarged view taken within the line 2-2 of FIG. 1.

FIG. 3 is a cross-sectional view taken along the line 3-3 of FIG. 2.

FIG. 4 is a partial schematic plan view showing the position of a wheel relative to the reinforcement member on the front pillar member prior to a small overlap frontal crash with an object.

DETAILED DESCRIPTION

Figure 5:
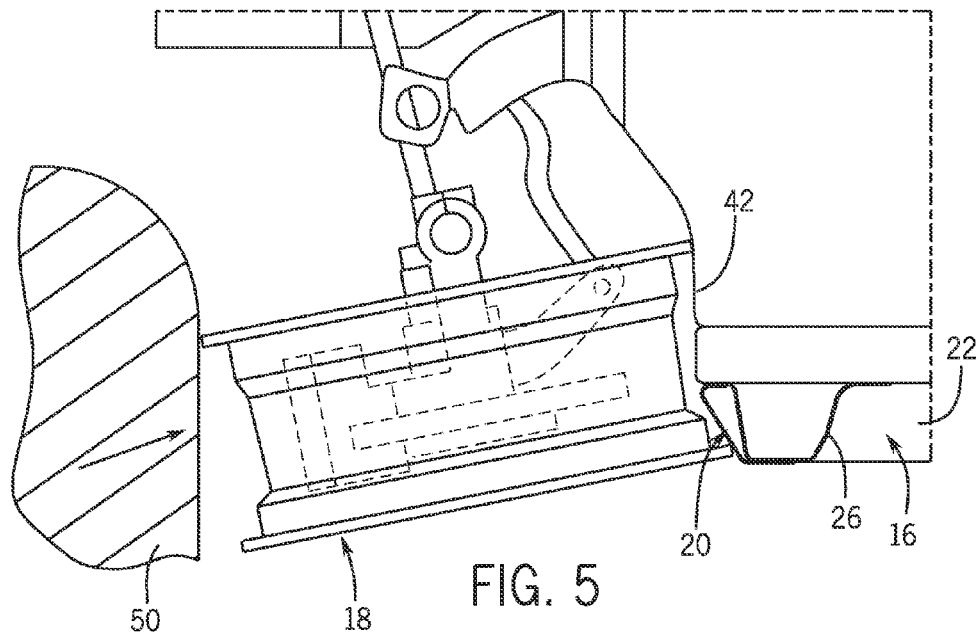
FIG. 5 is a view similar to FIG. 4 but shown after the wheel collides with the object and is driven back toward the pillar member.

Referring now to the drawings, wherein the showings are for purposes of illustrating one or more exemplary embodiments and not for purposes of limiting the same, FIG. 1 illustrates a vehicle 10 having a body 12 mounted on a vehicle frame 14. On each side of the vehicle, though only the left-hand side is shown in FIG. 1, the vehicle frame 14 includes a front pillar member 16 disposed rearward of a wheel 18 that is rotatably mounted to the frame 14 as is known and understood by those skilled in the art. As will be described in more detail below, the vehicle frame 14 also includes an angled reinforcement member 20 fixedly secured to the pillar member 16 at a location (e.g., the location illustrated in FIG. 1) arranged to break the wheel 18 during small overlap frontal crashes wherein the wheel 18 is forced rearward toward the pillar member 16 by the object colliding with the vehicle 10.

In the illustrated embodiment, the pillar member 16 is a hinge pillar member to which an associated vehicle door 30 is pivotally secured as it known and understood by those skilled in the art. The vehicle frame 14 also includes a side sill member 22 arranged approximately perpendicularly relative to the pillar member 16 so as to extend longitudinally rearwardly relative to a direction of travel of the vehicle from the pillar member 16. Accordingly, the pillar member 16 is disposed immediately forward of the side sill member 22 and arranged approximately perpendicularly upward relative to a longitudinal extent of the side sill member 22.

With additional reference to FIGS. 2 and 3, the pillar member 16 and the reinforcement member 20 can together be referred to as (or considered as comprising) a front pillar construction for the vehicle 10. More particularly, the pillar member 16 can be constructed of a pillar inner member 24 having pillar inner member mating flanges 24a, 24b and a pillar outer member 26 having pillar outer member mating flanges 26a, 26b welded, respectively, to the pillar inner member mating flanges 24a, 24b to form the pillar member 16 with a hollow construction as best shown in FIG. 3. Accordingly, the pillar member 16 is formed from the inner member 24 and the outer member 26, which are welded to one another along the respective mating flanges 24a, 24b, 26a, 26b.

The inner member 24 can include projecting wall portions 24c, 24d extending laterally inwardly from the mating flanges 24a, 24b and a projecting surface portion 24e offset laterally and inwardly from the mating flanges 24a, 24b. Likewise, the outer member 26 can include projecting wall portions 26c, 26d extending laterally outwardly from the mating flanges 26a, 26b and a projecting surface portion 26e offset laterally and outwardly from the mating flanges 26a, 26b. In particular, in the embodiment shown, the projecting wall portions 26c, 26d extend laterally outwardly a greater distance than the projecting wall portions 24c, 24d extend laterally inwardly from the mating flanges 24a, 24b, though this is not required.

The reinforcement member 20 can be particularly disposed at or adjacent a lower end of the pillar member 16 as shown best in FIGS. 1 and 2. In particular, the reinforcement member 20 is disposed only at a lower end of the pillar member 16 (i.e., it does not extend along a substantial longitudinal extent of the pillar member 16). This location can be aligned with an expected area at which the wheel 18 is expected to be directed in the event of a small offset frontal crash. Accordingly, the reinforcement member 20 can function as intended to break the wheel 18 during a small offset frontal crash without unnecessarily adding weight to the vehicle. In addition, the reinforcement member 20 can have a wedge shape for breaking the wheel 18 and directing a laterally outward portion 18a (best shown in FIG. 6) of the wheel 18 laterally outward away from the pillar member 16 and also away from the side sill member 22 disposed immediately behind the pillar member 16. More specifically, the reinforcement member 20 is fixedly secured to the pillar member 16 at a location arranged to break the wheel 20 of the vehicle 12 disposed immediately forward of the pillar member 16 during small overlap frontal crashes wherein the wheel 18 is forced rearward toward the pillar member 16 and the side sill member 22 disposed immediately therebehind.

The reinforcement member 20 bridges a forward distal end 32 of the forward mating flange 26a of the outer member 26 and a forward end 34 of the projecting surface portion 26e to define the wedge shape. More specifically, the reinforcement member 20 of the illustrated embodiment specifically includes an angled wall 20a, an overlapping rear flange 20b and an overlapping forward flange 20c. The angled wall 20a defines the wedge shape for breaking the wheel 18. In particular, the angled wall 20a bridges between the forward distal end 32 of the forward most mating flange 26a and the forward end 34 of the projecting surface portion 26e. The overlapping rear flange 20b extends rearwardly from the angled wall 20a to overlap the projecting surface portion 26e of the outer member 26. The overlapping forward flange 20c also extends rearwardly from the angled wall 20a, but at a laterally spaced apart location relative to the overlapping rear flange 20b to overlap the forward mating flange 26a of the outer member 26. Thus, the overlapping rear flange 20b and the overlapping forward flange 20c both extend in the same direction from the angled wall 20a (i.e., rearward relative to a forward direction of travel for the vehicle 10 in the illustrated embodiment) and the angled wall 20a extends between the overlapping rear flange 20b and the overlapping forward flange 20c.

In the illustrated embodiment, the overlapping rear flange 20b and the overlapping forward flange 20c are welded, respectively, to the forward mating flange 26a and the projecting surface portion 26e. In particular, the overlapping rear flange 20b can be welded to the projecting surface portion 26e as shown by weld 36 and the overlapping forward flange 20c can be welded to the forward mating flange 26a as shown by the weld 38. While shown in the illustrated embodiment as being welded, it should be appreciated by those skilled in the art that the reinforcement member 20 can be affixed via other methods, including for example bolting.

As shown, the vehicle body 12 and/or the vehicle frame 14 can include a wheel well member 40 defining a wheel well recess 42 in which the wheel 18 is received. In the illustrated embodiment, the wheel well member 40 has a mounting flange 40a overlapping a forward mating flange 24a of the inner member 24. The wheel well member 40 also has a main wall portion 40b extending laterally inwardly from the mating flange 40a and curving around toward a front of the vehicle 10 to define the wheel well recess 42. As best shown in FIG. 3, the angled wall 20a of the reinforcement member 20 forms an approximate contiguous surface with the wheel well member 40, and particularly the main wall portion 40b of the wheel well member 40. Accordingly, with continued reference to FIG. 3, only a small gap or recess 44 is defined between the angled wall 20a and the main wall portion 40b, whereas without the reinforcement member 20, the main wall portion 40b would abruptly end at the mating flanges 24a, 26a.

Figure 6:
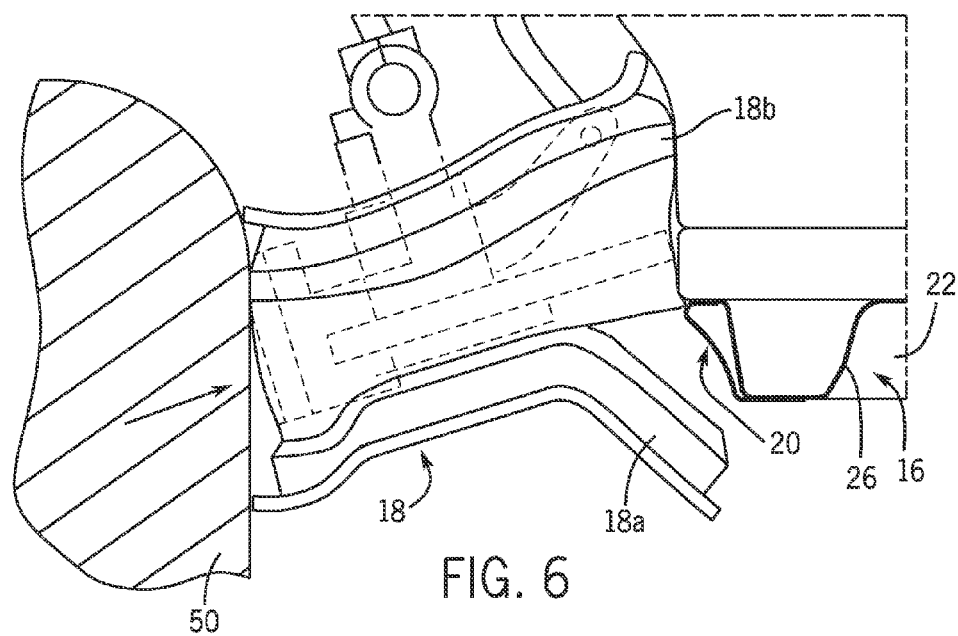
FIG. 6 is a view similar to FIGS. 4 and 5 but showing the reinforcement member breaking the wheel as the wheel is driven into or toward the front pillar member.

With reference now to FIGS. 4-6, during a small overlap crash event with an object, for example illustrated object 50 (which could be another vehicle, a tree, a pole, etc.), the wheel 18 can get trapped between the object 50 and the pillar member 16 as shown in FIG. 5. As also shown in FIG. 5, the wheel 18 gets pushed back in the direction of the pillar member 16 and the side sill member 22 immediately therebehind. Eventually, as shown in FIGS. 5 and 6, the wheel 18 will contact or engage the reinforcement member 20 due to the location of the reinforcement member 20 on the pillar member 18. Advantageously, the reinforcement member 20 pushes the wheel 18, and particularly the laterally outward portion 18a of the wheel, laterally outwardly. Typically, the laterally outward portion 18a of the wheel 18 is the wheel rim or styling surface, which is often the stiffest portion of the wheel 18. This outward or laterally outward push creates a bending moment on the wheel 18 about its axis of rotation causing the wheel 18 to break. Such breaking occurs at a much lower load than the axial loading on the wheel 18. In particular, as shown best in FIG. 6, the laterally outward portion 18a of the wheel can be broken apart from the remaining portion 18b of the wheel 18.

Once the wheel 18 is broken, load going into or toward the vehicle cabin is significantly reduced and the remaining energy from the impact is managed easily by the pillar member 16. This change in the load path helps to minimize cabin intrusions and improve occupant safety in small overlap frontal crashes. This all occurs with a large reduction in weight as compared to the typical method of ensuring against cabin intrusions due to small overlap frontal crashes (i.e., significantly bulking up the safety cage via reinforcements). In particular, sometimes 50 kg of reinforcements are necessary in the conventional method to reinforce the safety cage. This is replaced by the simple one-piece wedge-shaped reinforcement member 20, which can be much less than 50 kg.

Advantageously, the wedge-shape of the reinforcement member 20 changes the loading from axial (which requires a high breaking load) to a bending moment (which requires a low breaking load). This reduces and in some cases eliminates the need for any additional reinforcements in the body to deal with these types of small overlap frontal crashes. In addition, because this part is welded, bolted or otherwise secured to the outside of the body, the reinforcement member 20 provides much more flexibility during development because it can be easily changed or modified even late in the process.

Figure 7:
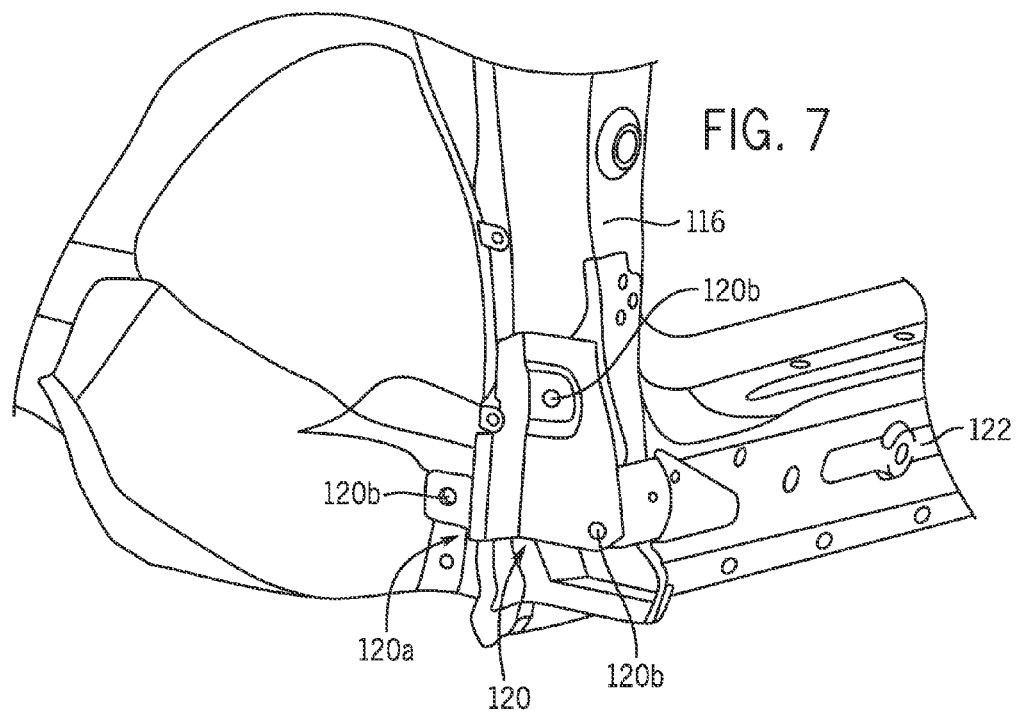
FIG. 7 is a partial schematic perspective view showing a reinforcement member secured to a front pillar of a vehicle frame according to an alternate exemplary embodiment.
Figure 8:
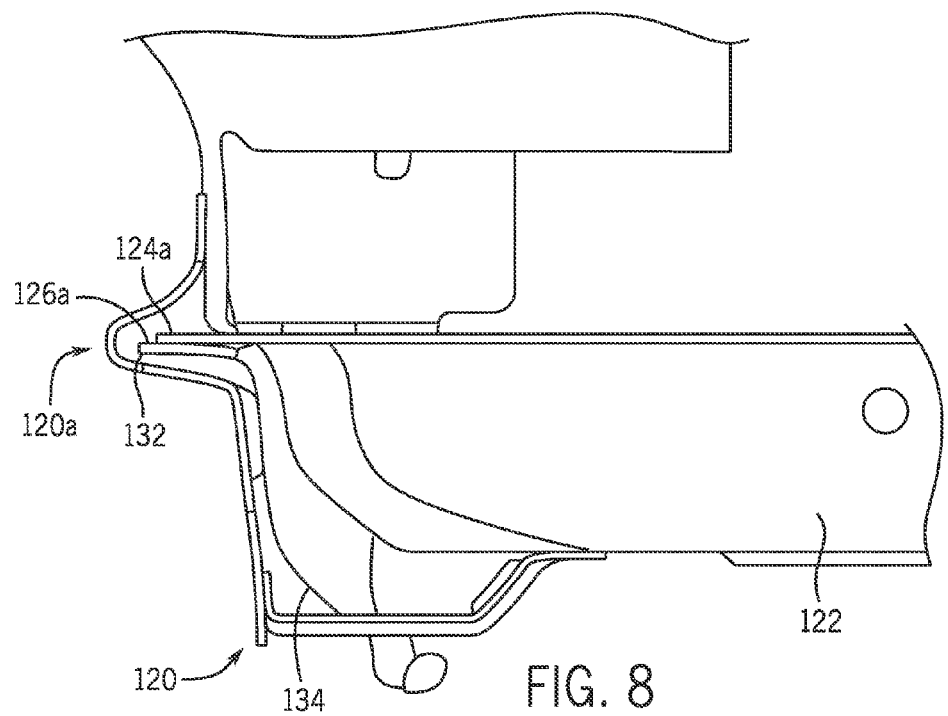
FIG. 8 is a cross-section view of the reinforcement member and front pillar member of FIG. 7.

Referring now to FIGS. 7 and 8, a reinforcement member 120 according to an alternate exemplary embodiment is illustrated fixedly secured to a pillar member 116 at a location (e.g., the location illustrated) arranged to break a wheel during small overlap frontal crashes wherein the wheel is forced rearward toward the pillar member 116 by an object colliding with the vehicle on which the pillar member 116 and the reinforcement member 120 are mounted. Except as shown and described, the pillar member 116 can be like the pillar member 16 and the reinforcement member 120 can be like the reinforcement member 20. As shown, the pillar member 116 can be mounted to a side sill member 122 arranged approximately perpendicularly relative to the pillar member 116 so as to extend longitudinally rearwardly relative to a direction of travel of the vehicle from the pillar member 116. Accordingly, the pillar member 116 is disposed immediately forward of the side sill member 122 and arranged approximately perpendicularly upward relative to the longitudinal extent of the side sill member 122. The side sill member 122 can be the same or similar to the side sill member 22 except as shown and described herein.

The pillar member 116 and the reinforcement member 120 can together be referred to as (or considered as comprising) a front pillar construction for a vehicle. As shown, the reinforcement member 120 can be particularly disposed at or adjacent a lower end of the pillar member 116 as best shown in FIG. 7. In particular, the reinforcement member 120 is disposed only at a lower end of the pillar member 116 (i.e., it does not extend along a substantial longitudinal extent of the pillar member 116). Like the reinforcement member 20, this location for the reinforcement member 120 can aligned with an expected area at which the wheel disposed immediately forward thereof (not shown) is expected to be directed in the event of a small offset frontal crash. Accordingly, the reinforcement member 120 can function like the reinforcement member 20 to break the wheel 18 during a small offset frontal crash without unnecessarily adding weight to the vehicle.

More specifically, the reinforcement member 120 includes a wedge-shape or nose 120*a* for breaking the wheel and directing a laterally outward portion of the wheel (e.g., laterally outward portion 18*a* of wheel 18) laterally outwardly away from the pillar member 116 and also away from the side sill member 122 disposed immediately behind the pillar member 116. More specifically, the reinforcement member 120 is fixedly secured to the pillar member 116 at a location arranged to break a wheel of the vehicle disposed immediately forward of the pillar member 116 during small overlapped frontal crashes wherein the wheel is forced rearward toward the pillar member 116 and the side sill member 122 disposed immediately therebehind.

Like the reinforcement member 20, the reinforcement member 120 bridges a forward distal end 132 and a forward end 134. Unlike the reinforcement member 20, the reinforcement member 120 includes the wedge-shape 120*a* as a nose structure that accommodates or fits over the mating flanges 124*a*, 126*a* of the pillar member 116. Also unlike the reinforcement member 20, the reinforcement member 120 is illustrated as having bolt holes 120*b* for bolted mounting to the pillar member 116, though other securing types could be used, such as welding. In most other respects, the reinforcement member 120 can function like the reinforcement member 20.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame comprising:
a pillar member disposed rearward of a wheel; and
a reinforcement member fixedly secured to the pillar member at a location arranged to break the wheel during small overlap frontal crashes wherein the wheel is forced rearward toward the pillar member, wherein the reinforcement member has a wedge shape for breaking the wheel and directing a laterally outward portion of the wheel laterally outward away from the pillar member, and wherein the pillar member is disposed immediately forward of a side sill member and arranged to extend approximately perpendicularly upward relative to a longitudinal extent of the side sill member.

2. The vehicle frame of claim 1 wherein the reinforcement member is disposed at or adjacent a lower end of the pillar member.

3. The vehicle frame of claim 1 wherein the pillar member is a hinge pillar member to which an associated vehicle door is pivotally secured.

4. The vehicle frame of claim 1 wherein the pillar member includes an outer member and an inner member, the outer and inner members welded to one another along respective mating flanges.

5. The vehicle frame of claim 4 wherein the outer member includes projecting wall portions extending laterally outward from the mating flanges and a projecting surface portion offset laterally from the mating flanges.

6. The vehicle frame of claim 5 wherein the reinforcement member bridges a forward distal end of a forward mating flange of the outer member and a forward end of the projecting surface portion to define a wedge shape.

7. The vehicle frame of claim 6 wherein the reinforcement member includes an overlapping rear flange that overlaps the projecting surface portion.

8. The vehicle frame of claim 7 wherein the reinforcement member further includes an overlapping forward flange that overlaps the forward mating flange of the outer pillar member and an angled wall that extends between the overlapping rear flange and overlapping forward flange, the overlapping rear flange and the overlapping forward flange both extending in the same direction from the angled wall.

9. The vehicle frame of claim 8 wherein the overlapping rear flange and the overlapping forward flange are welded, respectively, to the projecting surface portion and the forward mating flange.

10. The vehicle frame of claim 6 wherein the reinforcement member includes an overlapping forward flange that overlaps the forward mating flange of the outer pillar member.

11. The vehicle frame of claim 6 further including a wheel well member having a mounting flange overlapping a forward mating flange of the inner pillar member.

12. A front pillar construction for a vehicle, comprising:
a pillar inner member having pillar inner member mating flanges;
a pillar outer member having pillar outer member mating flanges welded to the pillar inner member mating flanges to form a front pillar member with a hollow construction; and
an angled reinforcement member fixedly secured to the pillar member at a location arranged to break a wheel of the vehicle disposed immediately forward of the pillar member during small overlap frontal crashes wherein the wheel is forced rearward toward the pillar member, the angled reinforcement member having a vertically extending wedge that tapers laterally in a direction laterally outward relative to the vehicle for breaking the wheel and directing the wheel laterally outwardly.

13. The front pillar construction of claim 12 wherein the angled reinforcement member bridges a forward distal end of a forward mating flange of the pillar outer member mating flanges and a forward end of a projecting surface of the pillar outer member, the projecting surface laterally offset relative to the pillar outer member mating flanges.

14. The front pillar construction of claim 12 wherein the angled reinforcement member includes:
   an angled wall defining a wedge shape for breaking the wheel;
   an overlapping rear flange extending rearwardly from the angled wall to overlap a projecting surface portion of the pillar outer member; and
   an overlapping forward flange extending rearwardly from the angled wall at a laterally spaced apart location relative to the overlapping rear flange to overlap a forward mating flange of the pillar outer member.

15. The front pillar construction of claim 14 wherein the overlapping rear flange is welded to the projecting surface portion and the overlapping forward flange is welded to the forward mating flange.

16. The front pillar construction of claim 12 wherein the angled reinforcement member is disposed only at a lower end of the front pillar member.

17. The front pillar construction of claim 12 wherein an angled wall of the angled reinforcement member forms an approximate contiguous surface with a wheel well member extending laterally inwardly from the front pillar member.

18. A reinforcement member for a vehicle frame, comprising:
   an angled wall defining a wedge shape for breaking a wheel during a small overlap frontal crash;
   an overlapping rear flange extending rearwardly from the angled wall to overlap a projecting surface portion of a pillar outer member; and
   an overlapping forward flange extending rearwardly from the angled wall at a laterally spaced apart location relative to the overlapping rear flange to overlap a forward mating flange of the pillar outer member.

* * * * *